J. R. NEIL.
Liquid-Coolers.
No. 140,529.  Patented July 1, 1873.
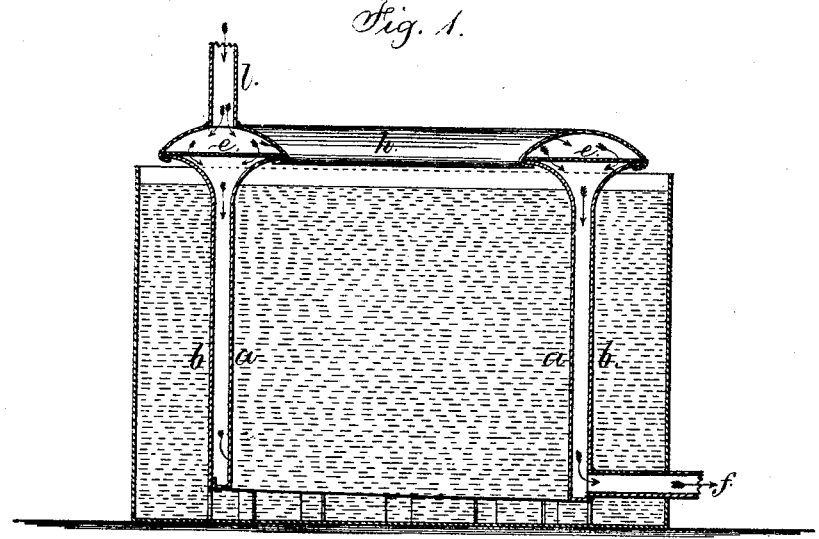
Fig. 1.
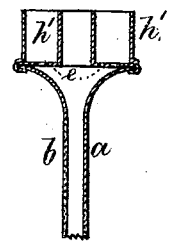
Fig. 2.
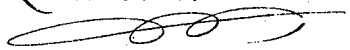

UNITED STATES PATENT OFFICE.

JAMES R. NEIL, OF WOLCOTTVILLE, CONNECTICUT.

IMPROVEMENT IN LIQUID-COOLERS.

Specification forming part of Letters Patent No. 140,529, dated July 1, 1873; application filed May 20, 1873.

*To all whom it may concern:*

Be it known that I, JAMES R. NEIL, of Wolcottville, in the county of Litchfield and State of Connecticut, have invented Improvements in Coolers for Liquids, of which the following is a specification:

I make use of a vessel composed of two casings united together at the bottom and flaring at the top in opposite directions; and upon the inner surfaces of these casings the liquid is allowed to run and spread itself in a thin film, to be cooled by the metal plate that is kept cool by water in which this hollow casing is immersed. By this construction a very cheap and efficient cooler is produced, and the liquid can be kept from undue contact with the atmosphere.

In the drawing, Figure 1 is a vertical section of said cooler, and Fig. 2 is a partial section illustrating a modification of the same.

The cooling-vessel is made of the casings $a$ and $b$, that are united at the lower ends, so as to form an annular chamber that is placed in any suitable tub, into which water is supplied to keep this vessel cool. The upper portions of the casings $a$ and $b$ are flaring, and one turns inwardly and the other outwardly; and above these flaring surfaces there is a plate, $e$, that is perforated with two or more lines of holes, so that the liquid to be cooled will run through these perforations and spread upon the flaring surfaces and descend upon the plates or casings $a\ b$ in a thin film and become cooled before reaching the bottom of the annular chamber. The pipe $f$ serves to convey away the liquid that has been cooled. Above the perforated plate $e$ there is an inclosing ring, $h$, either in the form of an annular cover, as seen in Fig. 1, or an open trough, $h'$, as in Fig. 2. In either case the liquid to be cooled is supplied by the pipe $l$, and flows with uniformity over the cooling-surface, but in the form shown in Fig. 1 the liquid is excluded from the atmosphere, while with the inclosing ring shown in Fig. 2 the liquid is left sufficiently exposed to the atmosphere to allow the vapors to escape. The casings $a\ b$ may be of corrugated or plain metal.

I claim as my invention—

The cooling apparatus composed of the casings $a$ and $b$, united together near the bottom, and formed with their upper portions flaring, in combination with the perforated plate $e$ that directs the liquid to be cooled, so that it runs upon the flaring portions of such casings, as and for the purposes set forth.

Signed by me this 8th day of May, A. D. 1873.

JAMES R. NEIL.

Witnesses:
ISAAC W. BROOKS,
A. F. MIGEON.